US007912885B2

(12) United States Patent
Barford

(10) Patent No.: US 7,912,885 B2
(45) Date of Patent: Mar. 22, 2011

(54) METHOD AND SYSTEM FOR FILTERING OF NETWORKED, SYNCHRONIZED MEASUREMENTS

(75) Inventor: Lee A. Barford, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 995 days.

(21) Appl. No.: 11/742,312

(22) Filed: Apr. 30, 2007

(65) Prior Publication Data

US 2008/0270504 A1    Oct. 30, 2008

(51) Int. Cl.
*G06F 17/10* (2006.01)

(52) U.S. Cl. ....................................... 708/300
(58) Field of Classification Search .................. None
See application file for complete search history.

(56) References Cited

U.S. PATENT DOCUMENTS

| | | | |
|---|---|---|---|
| 6,216,148 B1 * | 4/2001 | Moran et al. ................ | 708/819 |
| 7,324,931 B1 * | 1/2008 | Warlock ........................ | 703/13 |
| 2010/0166130 A1 * | 7/2010 | Rahbar ......................... | 375/362 |

OTHER PUBLICATIONS

Yonina C. Eldar, et al, Filterbank Reconstruction of Bandlimited Signals from Nonuniform and Generalized Samples, IEEE Transactions on Signal Processing, vol. 48, No. 10 Oct. 2000.
G. Grubel, The andecs Cace Framework, IEEE Control Systems, IEEE Xplore, Jun. 29, 2009.
German Patent and Trademark Office, 4 month office action, Jun. 29, 2009.
Wikibooks, The Open-content Textbooks Collection—"Control Systems/State-Space Equations"; http://en.wikibooks.org/wiki/Control_Systems/State-Space_Equations; downloaded Mar. 29, 2007; pp. 1-11.
Agilent Technologies, Inc.—"Agilent VEE Pro 8.0 & Agilent VEE Express 8.0—Data Sheet"; 6 pages.
Kenneth S. Miller and Donald M. Leskiw, Applied Research and Engineering, Inc., Bedford, MA 01730—"An Introduction To Kalman Filtering With Applications"; Robert E. Krieger Publishing Company, Malabar, Florida, 1987; pp. 10-18.

* cited by examiner

*Primary Examiner* — David H Malzahn

(57) ABSTRACT

A system processes discrete digital data according to a function, the discrete digital data including data values and time stamps, the time stamps being at non-uniform time intervals according to a time scale. The system comprises a processor having program instructions for implementing the function in terms of state space equations, using system design and data flow language software; inputting the discrete data into the implementation of the function; and outputting the result as an output discrete data stream of new data values and time stamps.

21 Claims, 2 Drawing Sheets

Flowchart 1

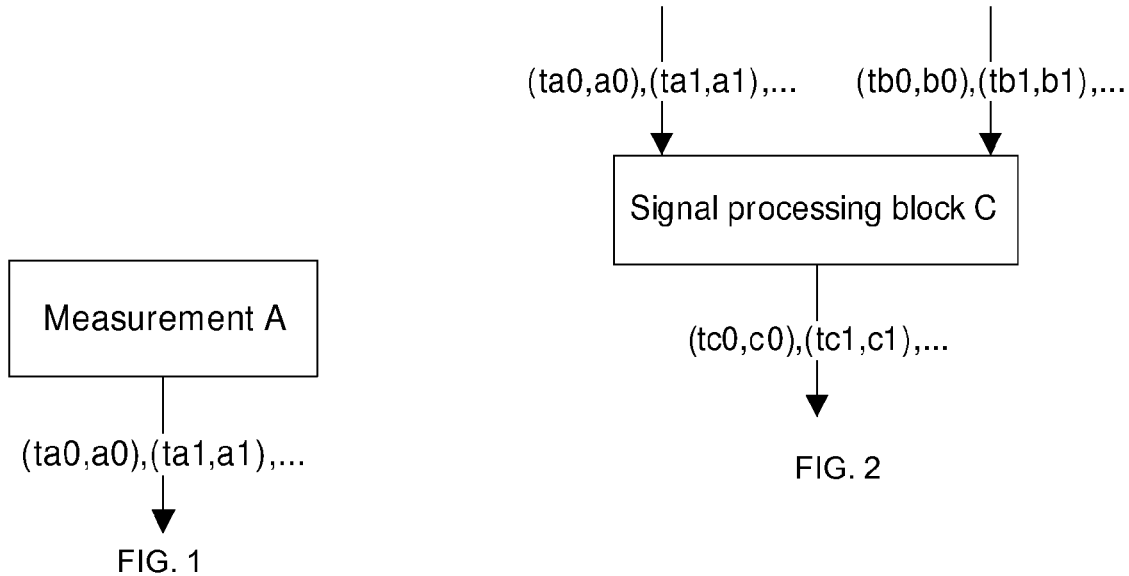
FIG. 1
FIG. 2
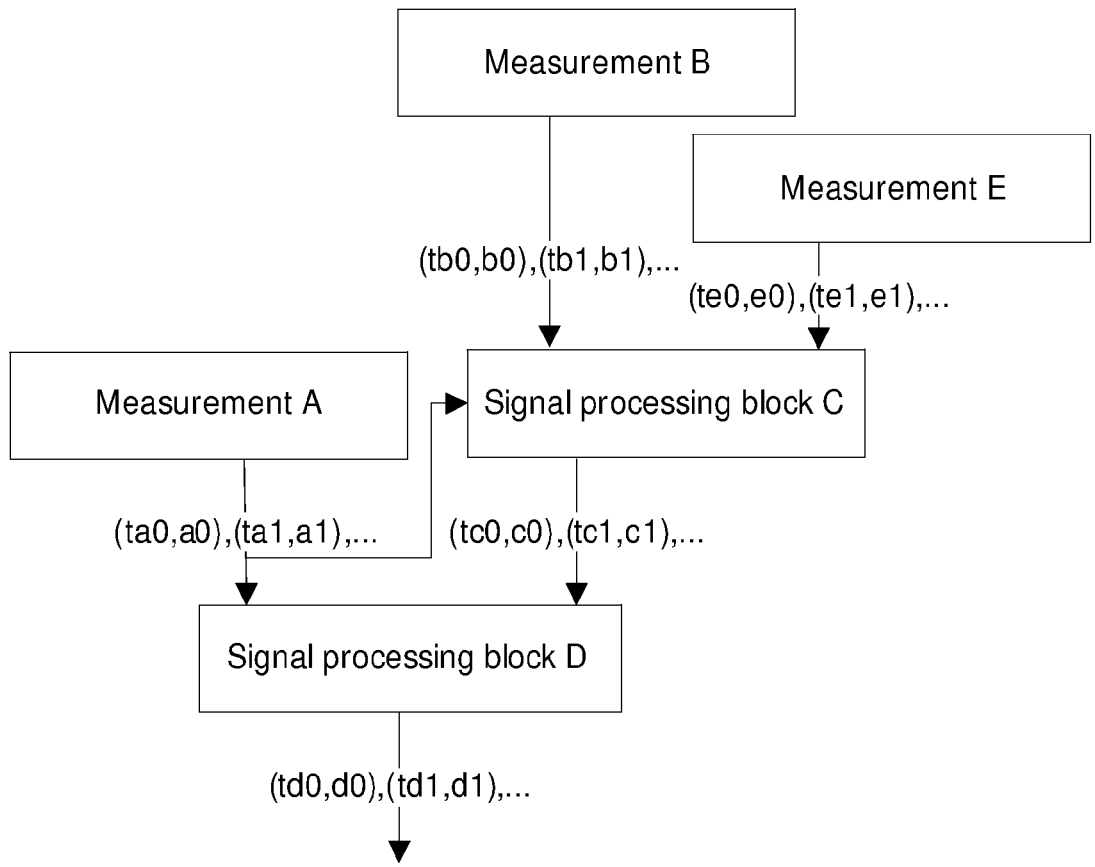
FIG. 3

Flowchart 1

METHOD AND SYSTEM FOR FILTERING OF NETWORKED, SYNCHRONIZED MEASUREMENTS

BACKGROUND OF THE INVENTION

In a system, such as a measurement or control system, that is made up of multiple instruments or other components that communicate through a communication medium such as a network, measurements, or signals are obtained by measurement or control devices for processing.

These devices (and perhaps also computers used to control them or process the signals) commonly have real-time clocks that are accurately synchronized, e.g., using IEEE 1588. Thus, the measurements may be time stamped as they are taken.

In such measurement or control systems, the times that measurements are taken can be obtained in one of two different ways:

In the first way, each measurement device, signal source, or control device latches signals to be measured or to be output into appropriate digitizers at even time intervals as determined by the synchronized real time clocks. In this case, the sampling is uniform, facilitating conventional forms of digital signal processing.

In the second way, each measurement device, signal source, or control device latches signals to be measured or to be output into appropriate digitizers when certain events, e.g., triggers, are detected. In this case, however, the sampling may be non-uniform, so the usual digital signal processing methods may not be applicable.

SUMMARY OF THE INVENTION

A system processes discrete digital data according to a function, the discrete digital data including data values and time stamps, the time stamps being at non-uniform time intervals according to a time scale. The system comprises a processor having program instructions for implementing the function in terms of state space equations, using system design and data flow language software; inputting the discrete data into the implementation of the function; and outputting the result as an output discrete data stream of new data values and time stamps.

Further features and advantages of the present invention, as well as the structure and operation of preferred embodiments of the present invention, are described in detail below with reference to the accompanying exemplary drawings.

BRIEF DESCRIPTION OF THE DRAWINGS

FIG. 1 is a block diagram of a functional unit for producing a time-stamped measurement.

FIG. 2 is a block diagram of a functional unit for processing time-stamped measurements.

FIG. 3 is a block diagram of a measurement system, employing multiple measurement units as per those of FIGS. 1 and 2.

DETAILED DESCRIPTION

Figure 4:
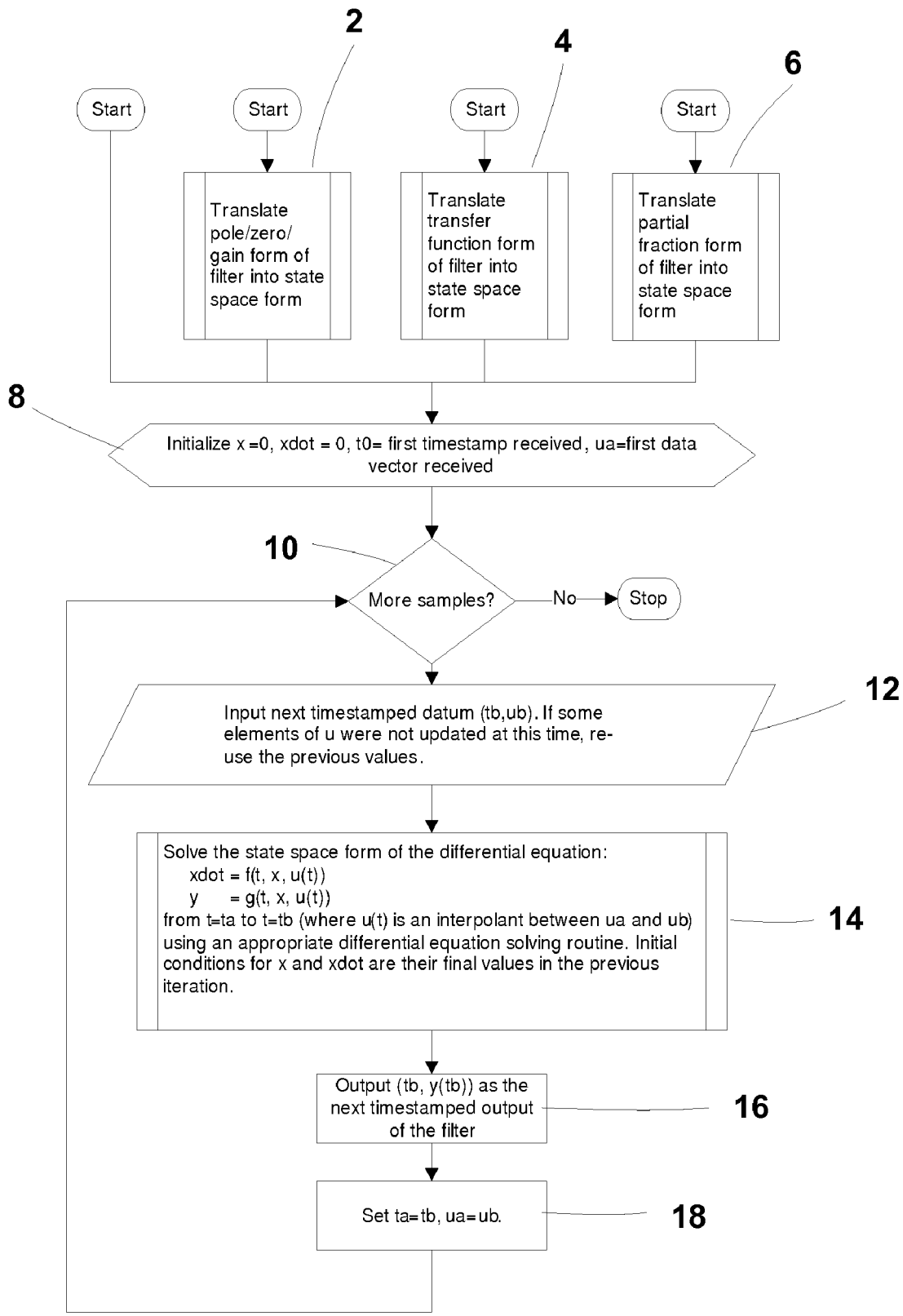
FIG. 4 is a flowchart showing operation of an embodiment of the invention.

In a system where signal measurement sampling may be non-uniform and the usual digital signal processing methods may not be applicable, signal processing may conventionally be performed by resampling the measured data with interpolation in order to convert it to uniformly sampled data. There are several drawbacks to such a method, including the following:

First, the volume of data that must be processed increases, perhaps many fold.

Second, signal processing algorithms must operate on this increased volume of data.

Third, as the number of measurements in the measurement system grows, this solution does not scale well. Either data must be passed around at various sample rates and resampled as needed, or a single resampling rate for the entire measurement system must be negotiated among the measurement system's signal processing components. This common resampling rate will have to be above the Nyquist frequency for the highest frequency signal to be measured or processed, even though many signals within the system may have much lower frequencies.

Fourth, if data is passed around at various sample rates, the complexity of design of the measurement system is greatly increased. This is because each component of the system must be carefully configured, so that the proper data rates are used to process each signal. This complexity results in longer time to design and properly construct a working measurement or control system.

Also, note that certain kinds of software used to design and/or implement signal processing for uniformly sampled signals are not useful alone when sampling is non-uniform. Such kinds of software include (1) software for designing digital filters, such as digital FIR and IIR filters; and (2) software for designing measurement and measurement processing systems where data is acquired and processed at one or more fixed sampling rates. Examples of such software include Mathworks' Simulink, National Instruments' LabView, and Agilent's VEE. For the purpose of the present specification, such software will be referred to, generically and without limitation as to vendor, brand name, etc., as "system design and data flow language software".

Consider a measurement node in a time synchronized measurement or control system. FIG. 1 is a block diagram representation of such a measurement node. The measurement node produces a sequence of measurements, in the form of pairs. Each such pair includes a data measurement and a time stamp. The node is sampling non-uniformly. It is can be thought of as functional block that outputs a stream of (measurement, time stamp) pairs.

The data measurement may include a vector of parameter measurements in an ordered relationship. That is, the node output is an ordered pair in which the first term is the n-dimensional measurement vector, and the second term is the time stamp, which might be a scalar expression representing the time, according to the system's time scale. For the purposes of most of the description which follows, it will be assumed that the measurements are such n-dimensional vectors. (A scalar measurement is then a 1-dimensional measurement vector.)

Referring now to FIG. 2, there is shown a functional block, that receives as inputs one or more streams of (measurement; time stamp) pairs, and that outputs a stream of processed (measurement; time stamp) pairs: The output stream is made up of (measurement, time stamp) pairs that are produced using the input (measurement, time stamp) pairs, and producing a continuous operation, in the time domain, using state space equations that define the functionality of the functional block. From the continuous time domain operation, it is possible to produce the output stream of (measurement, time stamp) pairs that may be employed for processing. For instance, if data sampled at even time intervals are required, then the continuous time domain operation of the functional block of FIG. 2 can produce such evenly-timed samples.

A signal processing block such as that of FIG. 2 can implement functions such as filters. The filters can be of many kinds, for example (i) linear time invariant filters having desired frequency domain effects, such as low pass, band pass, and high pass filters; (ii) linear filters for state or parameter estimation, e.g., Kalman filers; (iii) nonlinear filters for other specialized functions; or (iv) FIR filters.

Such measurement functional blocks and signal processing blocks can be interconnected arbitrarily, providing a consistent way of composing a measurement or control system: As one example of many possible configurations of such blocks, see FIG. 3.

However, where non-uniform samples are taken, the above-discussed challenges relating to the non-uniformity remain.

In an embodiment of the invention, signal processing may be performed, without the need for resampling, by operating in the continuous time domain, rather than the discrete time domain. Accordingly, results for the digital domain may be obtained, analogous to signal processing that has been done in the continuous time domain with analog hardware.

The continuous time domain filter (such as that of FIG. 2) can have any function. Examples include filters with frequency domain effects, e.g., low pass, band pass, or high pass filters, for demodulation, nonlinear denoising filters, or state estimation filters (such as Kalman filters). Note that this formulation includes many common operations on signals that are not usually called "filters," such as summing two or more signals, subtracting two signals, multiplying two or more signals, and frequency down- or up-conversion (because these consists of multiplying a signal with a sine then and low pass filtering).

The continuous domain filter is expressed, or expressible, as state space equations. In general, state space equations for a system define (i) the system's current state (the "state equation"), and (ii) the outputs of the system that result from the system's current state and the inputs to the system while it in that state (the "output equation"). In an embodiment of the invention, the state space equations for such a filter can be linear or non-linear, and can be time invariant or time varying.

Existing software tools may be used for converting other common forms for expressing filters into state space equations. For example, Matlab has a routine for converting filters in various other forms, such as (i) pole/zero/gain form, (ii) transfer function form, and (iii) partial fraction form, into state space equations.

Also, filters in these forms and other similar forms are given in the literature for a variety of purposes, such as frequency filtering (low-, band-, and high-pass filters) and parameter estimation filters (e.g., Kalman filters). For instance, the Matlab Signal Processing Toolbox includes routines for arriving at state space equations for a low-, high-, or band pass filter with given design parameters, such as cut off frequency or frequencies, passband and stopband ripple, and so forth. Also, Miller, "An Introduction to Kalman Filtering With Applications", Malabar. Florida: Robert E. Krieger Publishing Co., (1987), p. 27, describes how to obtain a continuous-time Kalman filter state for a particular system model as state space equations of the form needed in this invention.

As illustrated in FIGS. 1, 2, and 3, a measurement system that uses continuous domain filtering may be described through diagrams that show measurement sources and filters and signal processing blocks as blocks or other shapes, and flows of time stamped data as lines connecting these shapes.

FIG. 4 is a flow chart showing a method for processing discrete digital data, embodying the invention. Functional blocks such as those of FIGS. 1, 2, and 3 may be implemented as shown in FIG. 4. The processing is done according to a function, implemented in this embodiment as state space equations. The state space equations may, for instance, be differential equations.

An embodiment of the method includes employing the implemented function to receive the input data at non-uniform times, and to generate an output discrete data stream. The output discrete data stream is suitable for processing by a desired data processor, data processing technique, etc. For instance, the output data stream may include an output data stream with time stamps at uniform intervals.

Discrete digital data is input, for instance from multiple sources. Input data includes data values and time stamps according to a time scale. The time stamps may be at non-uniform time intervals, for instance if they are obtained from triggering events that do not follow a uniform sampling schedule or the like. The discrete digital data may be in different forms, such as pole/zero/gain, transfer function, or partial fraction forms. Inputting the data in these various forms may include translating (2, 4, 6) the data into state space form.

The remainder of the flowchart of FIG. 4 generally shows an exemplary process of employing the implemented function to generate an output discrete data stream suitable for processing by processing methods that require data sampled at uniform time intervals.

In the exemplary embodiment, process variables are initialized (8). Time stamped data is expressed in the form of pairs (t,u) where t is the time stamp and u is the data value. Subscripts denote the succession of data samples.

A check (10) is performed, whether there are input samples, and if not, the processing stops. If there is a sample, then the illustrated method proceeds, and the sample is processed.

The state space equations (such as differential equations) are solved (14), for instance using (12) initial conditions or boundary values such as the newly input sample, and/or calculated values or samples left over from previous calculations (that is, from previous cycles of the flow chart). In block 14, t represents time, measured in the same units as those provided by the synchronized real time clocks in the instruments, sensors, or data acquisition apparatus. x is the vector of state variables. xdot represents the change of the state variables with respect to time, for example the time derivatives, time partial differences, or forward or backward differences of the state variables. f and g are both functions provided by the filter designer, usually as a program function written in a computer language such as C, C++, C#, Java, Python, Matlab, Simulink, VEE, or LabView. y is the output of the filter.

The state space equations (such as differential equations) are solved (14), to produce a continuous data function y, over the time interval specified by the timing values.

An output data pair (with time stamp) is provided (16). Successive such output data pairs form an output discrete data stream that is suitable for processing by processing methods that require data sampled at uniform time intervals.

New initial conditions or boundary values are set (18), based on the results of the calculation. Then, further checks for new incoming samples are made (10), etc.

A software system for design and/or implementation of a networked, time-synchronized measurement system embodying the invention can be built, that allows an operator to design the acquisition, flow, and processing of time-stamped data from networked, time-synchronized measurement nodes, for instance, those of FIG. 3. A general purpose computer, processor, digital signal processor, reconfigurable computer implemented in a field programmable gate array (FPGA) or other programmable logic, etc., may be used for implementing and operating such a software system. For the purpose of claiming the invention and describing embodiments of the invention, the term "processor" will be used generically, to include all of the above. Also, the invention may be embodied in a computer program product, such as a preprogrammed CD-ROM, network download, etc., to be installed into, and operated on, a user's computer or processing system.

Such a software system would include an input apparatus, such as a graphical user interface, that slows the operator to input the measurement and processing nodes/units to be used and the flows that connect them. The input apparatus would also allow the operator to specify the state space equations for each such note. For instance, the operator might be able to enter the equations directly, such as by typing, downloading, etc.

Additional features of such a software system might optionally include the following:

(1) State space equations may be imported from other software used to design the filters, e.g., the Matlab Signal Processing Toolbox used to design continuous time filters.

(2) A specification may be made, of which logical blocks in the diagram (e.g., FIG. 3) are to be implemented on what hardware. The specification for a given logical block can include a generic hardware description, and specific, branded part number, etc.

(3) Operation of the measurement system may be simulated. Such a simulation may, for instance, use data obtained from files on external systems, or may be specified by equations or by random number generators or other algorithmic means.

(4) Means for organizing the compilation of filters and selecting and compiling the optimal state-space equation solver needed for a particular filter to be implemented on a particular processing node.

(5) Means for uploading configuration information and/or compiled code into measurement, processing, and control nodes.

(6) The model of the system (e.g., FIG. 3), may be used for initiating, controlling, monitoring, and terminating operation of the measurement system itself. For instance, the operator may do so through the above-described graphical user interface.

Additional features of embodiments of the invention include the following:

The volume of data that must be processed is set by the rates of incoming measurements, and need not be higher.

Signal processing algorithms need operate on the measured data only at its actual incoming rate.

Scalability makes it possible that, various measurement modules, signal source modules, control modules, and processing/computing modules can be interconnected into a system with no programming or negotiating required in order to establish signal data rates. Instead, raw or processed signal values are passed on the network as needed.

Systems and methods embodying the invention result in measurement and control systems that are easy, and hence fast and inexpensive, to design and construct properly.

Embodiments of the invention enable construction of networked, modular measurement systems where a global analysis and design of data rates need not be done. This capability reduces measurement system construction effort.

Although the present invention has been described in detail with reference to particular embodiments, persons possessing ordinary skill in the art to which this invention pertains will appreciate that various modifications and enhancements may be made without departing from the spirit and scope of the claims that follow.

APPENDIX

Here is Matlab code that gives an example implementation of an RC low pass filter for networked, time-stamped measurements.

```
function low_pass_demo( )
load -ascii 'burch_ts_data.txt'
timestamps = burch_ts_data(:,3);
data = burch_ts_data(:,2);
data_pp = interp1(timestamps, data, 'spline', 'pp');
rc = 20;
algorithm = 2;
if algorithm==1
    options = odeset('AbsTol',1e-
3, 'Jacobian',@rc_Jacobean,'Events',@rc_events);
    tic;
    sol = ode45(@rc_odefun,timestamps,data(1),options,rc,data_pp);
    %[t,y,te,ye,ie] =
ode45(@rc_odefun,timestamps,data(1),options,rc,data_pp);
    toc
%    t_lowpass = ([0:1000]/1000)*(timestamps(end)-
timestamps(1))+timestamps(1);
%    y_lowpass = deval(sol, t_lowpass);
%    plot(t_lowpass, y_lowpass, 'k-', sol.x, sol.y, 'k*', timestamps,
data, 'r.');
    plot(te, ye, 'k-', timestamps, data, 'r.');
    xlabel('timestamp (s)')
    ylabel('temperature (deg K)')
elseif algorithm==2
    ode_options = odeset('AbsTol',1e-2,'RelTol',1e-3);
    % So the whole integration at once, for comparison
    sol = ode45(@rc_odefun,timestamps,data(1),
    ode_options,rc,data_pp);
    t_lowpass_fast = ([0:2000]/2000)*(timestamps(end)-
timestamps(1))+timestamps(1);
    y_lowpass_fast = deval(sol, t_lowpass_fast);
    % Do the integration one timestamped datum at a time
    t_filtered = timestamps(1);
    y_filtered = data(1);
    tic;
    for i = 2:length(timestamps)
        %[ode_t, ode_y] = ode45(@rc_odefun, [timestamps(i-1)
timestamps(i)], y_filtered(end), ode_options, rc, data_pp);
        [ode_t, ode_y] = ode45(@rc_odefun_2pt, [timestamps(i-1)
timestamps(i)], y_filtered(end), ode_options, rc, timestamps(i-1),
timestamps(i), data(i-1), data(i));
        t_filtered = [t_filtered; ode_t(2:end)];
        y_filtered = [y_filtered; ode_y(2:end)];
        if mod(i,20)==0
            i
        end
    end
    elapsed_time = toc
    time_per_sample = elapsed_time / length(timestamps)
    % Plot both together, so we can see the error
    plot(t_filtered, y_filtered, 'k-', t_lowpass_fast, y_lowpass_fast,
'b-', timestamps, data, 'r.');
    xlabel('timestamp (s)')
    ylabel('temperature (deg K)')
end
function dy = rc_odefun(t, y, rc, pp)
% dy = rc_odefun(t, y, rc, timestamps, data)
%
% Differential equation for an RC filter with time
% constant RC applied to timestamped data given by
% timestamps & data. For use by the Matlab solvers
% ode23, ode23s, etc.
%
% Lee Barford Agilent Laboratories 10 Nov 04
dy = (ppval(pp,t) - y) / rc;
function dfdy = rc_Jacobean(t, y, rc, pp)
dfdy = -y/rc;
```

```
function [value,isterminal,direction] = rc_events(t,y, rc, pp)
tdif = t - pp.breaks;
value = min(tdif.*tdif);
isterminal = 0;
direction = 0;
function dy = rc_odefun_2pt(t, y, rc, t_start, t_stop, data_start,
data_stop)
data_interp = (data_stop-data_start)/(t_stop-t_start) + data_start;
dy = (data_interp - y) / rc;
```

What is claimed is:

1. A method, implemented in a processor, for processing discrete digital data according to a function, the discrete digital data including data values and time stamps, the time stamps being at non-uniform time intervals according to a time scale, the method comprising:
    implementing the function in the processor in terms of state space equations, using system design and data flow language software;
    inputting the discrete data received by the processor into the implementation of the function; and
    outputting the result as an output discrete data stream of new data values and time stamps by the processor.

2. A method as recited in claim 1, further comprising employing the implemented function to generate an output discrete data stream suitable for processing by processing methods that require data sampled at uniform time intervals.

3. A method as recited in claim 2, wherein the employing to generate includes generating an output discrete data stream including data that is time stamped at uniform time intervals according to the time scale.

4. A method as recited in claim 1, wherein the implementing the function includes implementing the function in the continuous time domain.

5. A method as recited in claim 4, wherein the implementing the function includes implementing the function including a differential equation.

6. A method as recited in claim 1, wherein each datum of the received data includes (i) a measurement of a parameter value, and (ii) a time stamp associated with the measurement of the parameter value, and representing a time, according to a time scale, at which the measurement was made.

7. A method as recited in claim 1, wherein the inputting includes inputting the discrete data from multiple sources.

8. A system for processing discrete digital data according to a function, the discrete digital data including data values and time stamps, the time stamps being at non-uniform time intervals according to a time scale, the system comprising a processor having program instructions for:
    implementing the function in terms of state space equations, using system design and data flow language software;
    inputting the discrete data into the implementation of the function; and
    outputting the result as an output discrete data stream of new data values and time stamps.

9. A system as recited in claim 8, wherein the processor further has program instructions for employing the implemented function to generate an output discrete data stream suitable for processing by processing methods that require data sampled at uniform time intervals.

10. A system as recited in claim 9, wherein the program instructions for employing to generate include program instructions for generating an output discrete data stream including data that is time stamped at uniform time intervals according to the time scale.

11. A system as recited in claim 8, wherein the program instructions for implementing the function include program instructions for implementing the function in the continuous time domain.

12. A system as recited in claim 11, wherein the program instructions for implementing the function include program instructions for implementing the function including a differential equation.

13. A system as recited in claim 8, wherein each datum of the received data includes (i) a measurement of a parameter value, and (ii) a time stamp associated with the measurement of the parameter value, and representing a time, according to a time scale, at which the measurement was made.

14. A system as recited in claim 8, wherein the program instructions for inputting include program instructions for inputting the discrete data from multiple sources.

15. A computer program product for directing a processor to process discrete digital data according to a function, the discrete digital data including data values and time stamps, the time stamps being at non-uniform time intervals according to a time scale, the computer program product comprising:
    a computer-readable medium; and
    program instructions, on the computer-readable medium, for directing the processor to:
        (i) implement the function in terms of state space equations, using system design and data flow language software;
        (ii) input the discrete data into the implementation of the function; and
        (iii) output the result as an output discrete data stream of new data values and time stamps.

16. A computer program product as recited in claim 15, wherein the program instructions further comprise program instructions, on the computer-readable medium, for directing the processor to employ the implemented function to generate an output discrete data stream suitable for processing by processing methods that require data sampled at uniform time intervals.

17. A computer program product as recited in claim 16, wherein the program instructions, on the computer-readable medium, for directing the processor to employ to generate include program instructions, on the computer-readable medium, for directing the processor to generate an output discrete data stream including data that is time stamped at uniform time intervals according to the time scale.

18. A computer program product as recited in claim 15, wherein the program instructions, on the computer-readable medium, for directing the processor to implement the function include program instructions, on the computer-readable medium, for directing the processor to implement the function in the continuous time domain.

19. A computer program product as recited in claim 18, wherein the program instructions, on the computer-readable medium, for directing the processor to implement the function include program instructions, on the computer-readable medium, for directing the processor to implement the function including a differential equation.

20. A computer program product as recited in claim 15, wherein each datum of the received data includes (i) a measurement of a parameter value, and (ii) a time stamp associated with the measurement of the parameter value, and representing a time, according to a time scale, at which the measurement was made.

21. A computer program product as recited in claim 15, wherein the program instructions, on the computer-readable medium, for directing the processor to input include program instructions, on the computer-readable medium, for directing the processor to input the discrete data from multiple sources.

* * * * *